United States Patent [19]

Oku

[11] 4,340,302

[45] Jul. 20, 1982

[54] ENDOSCOPE WITH SENSOR

[75] Inventor: Toshio Oku, Tokyo, Japan

[73] Assignee: Machida Endoscope Co., Ltd., Tokyo, Japan

[21] Appl. No.: 12,612

[22] Filed: Feb. 16, 1979

[30] Foreign Application Priority Data

Feb. 28, 1978 [JP] Japan .................................. 53-21649

[51] Int. Cl.³ .......................................... G01M 21/00
[52] U.S. Cl. .................................. 356/241; 250/227; 356/4
[58] Field of Search ...................... 250/227; 356/4, 241

[56] References Cited

U.S. PATENT DOCUMENTS

| 3,027,477 | 3/1962 | Sheldon | 250/227 |
| 3,327,584 | 6/1967 | Kissinger | 250/227 |
| 3,549,264 | 12/1970 | Christie | 250/227 |
| 3,551,061 | 12/1970 | Glowa | 356/141 |
| 3,778,157 | 12/1973 | Brelot et al. | 250/227 |
| 3,867,033 | 2/1975 | Hasinger | 250/227 |
| 3,895,870 | 7/1975 | Cullen et al. | 356/4 |
| 3,940,608 | 2/1976 | Kissinger | 250/227 |

Primary Examiner—Harold A. Dixon
Attorney, Agent, or Firm—Berger & Palmer

[57] ABSTRACT

The present invention discloses a construction of an industrial endoscope with a sensor which is used for measuring the position and the moving direction of a distal end of said endoscope. The construction comprises a measuring window at said distal end, light-transmitting optic bundles and light-receiving optic bundles, forward ends of said light-transmitting optic bundles and light-receiving optic bundles being opposed to said measuring window, a backward end of said light-transmitting optic bundles being connected with a light source and a backward end of said light-receiving optic bundles being connected with a detector means. By this construction, a reactor can be safely inspected from a distance, preventing damage to said distal end and elimination of potential radiation danger to the inspector.

2 Claims, 7 Drawing Figures

FIG. 4  FIG. 5  FIG. 6
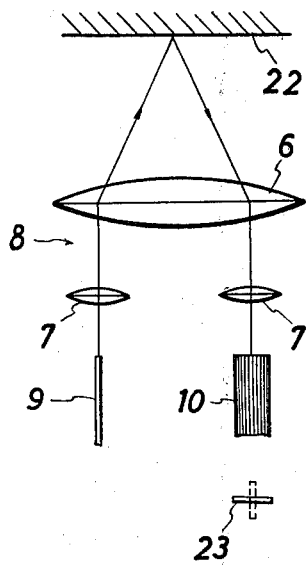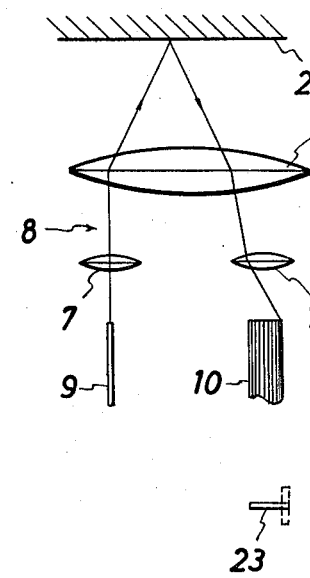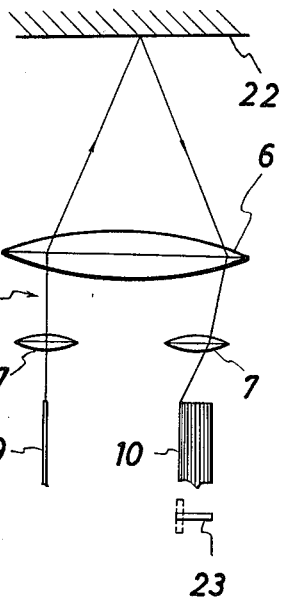
FIG. 7
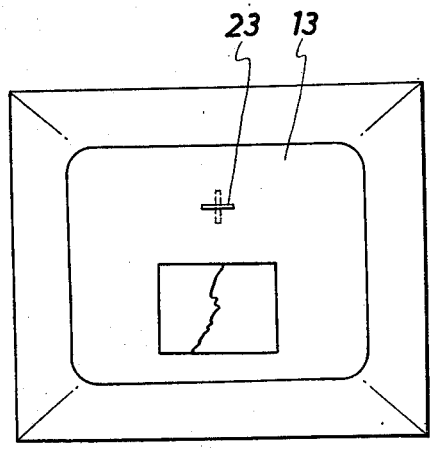

ENDOSCOPE WITH SENSOR

BACKGROUND OF THE INVENTION

A. Field of the Invention

The present invention relates to an industrial endoscope, or more particularly, to an endoscope with sensor means by which the position and the moving direction of the distal end of the endoscope can be measured.

B. Description of the Prior Art

A common endoscope is an apparatus for observing such as a body cavity by illuminating an object with a light fed by fiber optic bundles and leading an image of said object to an eyepiece in a grip. In recent years, the endoscope has been used for industrial appliances. For example, it is used for inspecting cracks inside a reactor which radiates radioactive rays or inside a gas tank in which stored a poisonous gas. By the way, as an eyepiece is not provided in the industrial endoscope, the movement of the distal end in the reactor cannot be observed. For this reason, the distal end may collide against a solid wall of the object. Then, the distal end is damaged and, moreover, the position and the moving direction of it cannot at all be observed.

SUMMARY OF THE INVENTION

The present invention aims at an improved construction of an endoscope with sensor means by which the position and the movement of a distal end can be measured.

The construction comprises, a measuring window at said distal end, light-transmitting optic bundles and light-receiving optic bundles, forward ends of said light-transmitting optic bundles and light-receiving optic bundles being opposed to said measuring window via a measuring lens means, a backward end of said light-transmitting optic bundles being connected with a light source and a backward end of said light-receiving optic bundles being connected with a detector means.

It is a first object of the invention to obtain an endoscope with sensor means by which the inside of a reactor can be safely inspected, preventing damage to the distal end.

It is a second object of the invention to provide an endoscope with sensor means by which a wall of the object can be observed at a suitable position, measuring a relative distance to it.

It is a third object of the invention to provide an endoscope with sensor means by which the position and the moving direction of the distal end can be measured.

The above and further objects and novel features of the invention will more fully appear from the following detailed description when the same is read in connection with the accompanying drawings. It is to be expressly understood, however, that the drawings are for purpose of illustration only and is not intended as a definition of the invention.

BRIEF DESCRIPTION OF THE DRAWINGS

FIGS. 4 to 6 are diagrammatic views showing functions of the sensor.

FIG. 7 is an elevational view showing a display by a monitoring television.

DESCRIPTION OF PREFERRED EMBODIMENTS

Preferred embodiments of the invention will be described hereinunder with reference to the figures.

Figure 1:
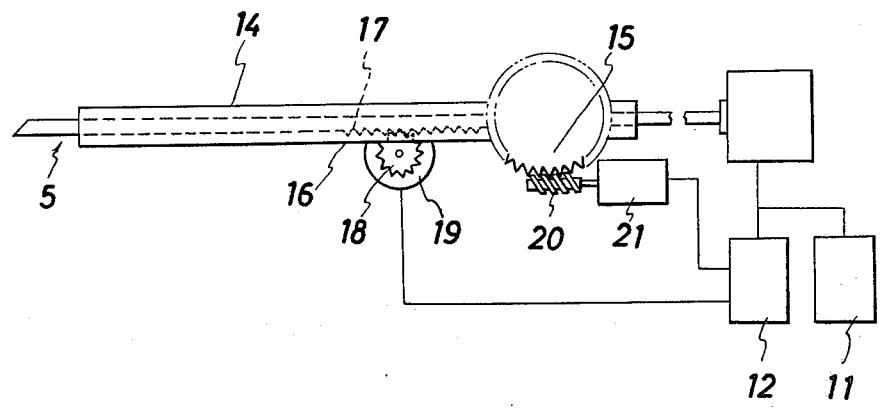
FIG. 1 is a schematic illustration of an endoscope with sensor means according to an embodiment of the present invention.
Figure 2:
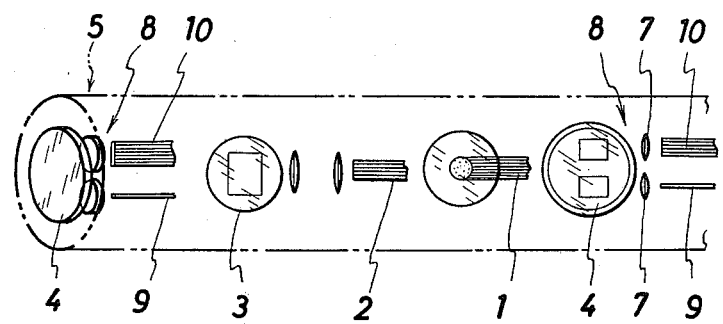
FIG. 2 is a schematic illustration of a distal end according to an embodiment of the present invention.
Figure 3:
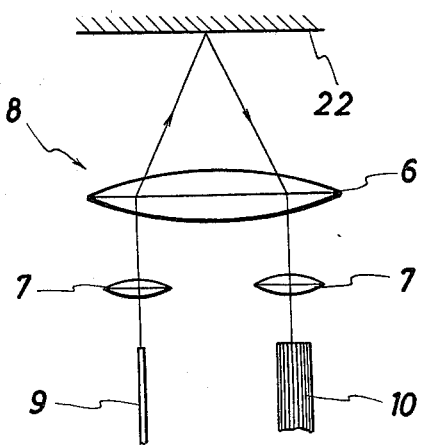
FIG. 3 is a partial diagrammatic view of a sensor according to an embodiment of the present invention.

In FIG. 2, numeral 1 indicates an illuminating means for sending out an illumination, numeral 2 indicates an observing optical means for transmitting an image of the object and numeral 3 indicates an observing window. In addition to said observing window 3, a measuring window 4 is provided at a distal end 5. One or a plurality of said measuring windows 4 may be provided at the tip or at the circumference of said distal end 5. Forward ends of light-transmitting optic bundles 9 and light-receiving optic bundles 10 are opposed via a measuring lens means 8 to said measuring window 4. Said measuring lens means 8 comprises a common lens 6 and an individual lens 7 as shown in FIG. 3. The sectional arrangement of the light-transmitting optic bundles 9 and the light-receiving optic bundles 10 may be at right angles to each other. In FIG. 1, the backward end of the light-transmitting optic bundles 9 is connected with a light source which generates a light beam for measuring. The backward end of the light-receiving optic bundles 10 is connected to a detector means 12 and a monitoring television 13. The detector means 12 feeds back the measured value to a control means mentioned below. Said monitoring television 13 displays the value for an operator.

In FIG. 1, an embodiment of the control means is shown schematically. Unlike the medical endoscope, an angle deflection means is not provided in the endoscope according to the present invention. A guide pipe 14 for leading the endoscope is secured to a suitable place of a reactor or so on, supported by an axis of a gear 15. A lanky hole 16 is provided at an axial circumference of said guide pipe 14 and a rack 17 is attached to the side of the endoscope in correspondence to said lanky hole 16. A gear 18 is attached to the side of said guide pipe 14. The distal end 5 can be moved in the forward and backward direction by the rack 17 which is driven by said gear 18 and a motor 19. A worm gear 20 which engages with the gear 15 rotates the guide pipe 14 to change the moving direction of the distal end 5.

Now, the function of the sensor will be described with reference to FIGS. 4 to 6. The light beam emanating from the light-transmitting optic bundles 9 reaches a wall 22 of the object via the measuring lens means 8. And then, a reflection enters a tip of the light-receiving optic bundles 10 via the common lens 6 and the individual lens 7. The distance between the wall 22 and the distal end 5 can be measured from the position to which the reflection enters the light-receiving optic bundles 10. Based on the result, the position of the distal end 5 and the moving direction of it is adjusted by the control means. That is to say, a standard distance L to the wall 22 is, in FIG. 4, so arranged that the reflection enters the center of the light-receiving optic bundles 10 by adjusting the measuring lens means 8. When the distal end 5 comes nearer to the wall 22 than the standard distance L, the reflection enters the tip of said light-receiving optic bundles 10, slightly deviated from the center of it, as shown in FIG. 5. On the contrary, when the distal end 5 is further from the wall 22 than the distance L, the reflection enters the other side of the light-receiving optic bundles 10, as shown in FIG. 6. In each case, the result is displayed in an indicator 23 of the monitoring television 13 in FIG. 7. In the monitoring television 13, an image of the object is shown which has been transmitted by the observing optical means 2 and, in addition, the distance between the distal end 5 and the wall 22 is shown by the indicator 23. The operator can acknowledge the position and the moving direction of the distal end 5 from the display, so that the position of the distal end 5 is adjusted via the control means automatically or by hand. A plurality of indicators 23 in the television may be provided corresponding to a number of sensor means provided at the distal end 5.

In the foregoing embodiment, the distance measurement is based on the deviation of the reflection. But, the measurement may also be based on the change of the quantity of the reflection, converting said change into an electric signal by an photoelectric element.

As is described in detail, the endoscope with sensor means according to the present invention can be operated, measuring the distance to the object by the sensor means. Thereby, the inside of the reactor and so on can be inspected safely, preventing the damage to the distal end.

While there have been shown and described and pointed out the fundamental novel features of the present invention as applied to preferred embodiments, it will be understood, however, that the various omissions and substitutions and changes in the form and details may be made by those skilled in the art without departing from the spirit of the invention.

What is claimed is:

1. An endoscope for inspecting a wall surface of an industrial apparatus, said endoscope comprising
   a distal forward end adapted to inspect said wall surface,
   a rear end,
   a fiber optic bundle located in said endoscope between said distal forward end and said rear end,
   said fiber optic bundle comprising a light-transmitting optic bundle and a light-receiving optic bundle, said endoscope further comprising a light source for supplying light to said light transmitting optical bundle toward said wall surface, said light-receiving optical bundle optically coupled to carry light reflected from said wall surface to said rear end of said endoscope,
   optical measurement means located at said distal end being optically coupled to said transmitting and light-receiving optical bundles to sense the distance between said optical means and said wall surface,
   said optical measurement means comprising a common optical lens and at least one transmitting optical lens optically located between said common optical lens and said light transmitting optic bundle and at least one receiving optical lens optically located between common optical lens and said light-receiving optic bundle, said common lens and said transmitting and receiving optical lenses optical coupled to said fiber optic bundle for receiving reflected light from said wall surface at varying positions on the common lens responsive to the distance of said optical means from said wall surface for thereby varying the refraction angle of said transmitted light,
   means for sensing the refracted light and providing a display as a function of the angle of refraction to thereby indicate said distance.

2. An endoscope for inspecting a wall surface of an industrial apparatus as claimed in claim 1 further comprising control means located at said rear end to control the movement of the distal end of said endoscope.

* * * * *